United States Patent
Sendzimir et al.

(10) Patent No.: US 6,658,947 B1
(45) Date of Patent: Dec. 9, 2003

(54) STRIP FLATNESS MEASURING DEVICE

(75) Inventors: Michael G. Sendzimir, Woodbury, CT (US); John W. Turley, Oxford, CT (US)

(73) Assignee: T. Sendzimir, Inc., Waterbury, CT (US)

( * ) Notice: Subject to any disclaimer, the term of this patent is extended or adjusted under 35 U.S.C. 154(b) by 0 days.

(21) Appl. No.: 09/645,899

(22) Filed: Aug. 25, 2000

(51) Int. Cl.$^7$ ................................................. G01L 1/04
(52) U.S. Cl. ........................... 73/862.451; 73/862.07; 73/862.474
(58) Field of Search ................ 73/159, 862.07, 73/862.391, 862.474, 818; 72/8, 12, 9.1, 229, 17; 702/127; 425/224

(56) References Cited

U.S. PATENT DOCUMENTS

| | | | |
|---|---|---|---|
| 3,186,220 A | 6/1965 | Flinth | 73/141 |
| 3,204,454 A | 9/1965 | Firman et al. | 73/143 |
| 3,413,846 A | 12/1968 | Flinth | 73/144 |
| 3,499,306 A | 3/1970 | Pearson | 72/17 |
| 3,557,614 A | 1/1971 | Muhlberg | 73/144 |
| 3,706,119 A * | 12/1972 | Collet | 29/113 R |
| 3,817,095 A | 6/1974 | Diolot | 73/159 |
| 3,902,363 A | 9/1975 | Ishimoto | 73/159 |
| 3,988,098 A * | 10/1976 | Kato et al. | 425/224 |
| 4,024,755 A | 5/1977 | Quehen | 73/105 |
| 4,116,029 A * | 9/1978 | Fabian et al. | 72/34 |
| 4,332,154 A | 6/1982 | Nordvall | 72/31 |
| 4,549,701 A | 10/1985 | Lucas | 242/75.3 |
| 4,674,310 A * | 6/1987 | Ginzburg | 72/17 |
| 4,972,706 A * | 11/1990 | Adolfsson et al. | 73/159 |
| 4,976,158 A * | 12/1990 | Ginzburg et al. | 73/862.07 |
| 5,275,062 A * | 1/1994 | Turley | 73/862.474 |
| 5,537,878 A * | 7/1996 | Sendmizir et al. | 73/862.391 |
| 5,829,287 A * | 11/1998 | Noe et al. | 72/8.6 |
| 5,943,895 A * | 8/1999 | Lemper | 72/241.4 |
| 6,212,960 B1 * | 4/2001 | Durand-Texte et al. | 73/862.07 |
| 6,480,802 B1 * | 11/2002 | Flormann | 702/127 |

FOREIGN PATENT DOCUMENTS

GB 1160112 7/1969

OTHER PUBLICATIONS

Angeid, E., *Strip Stiffness as the Deciding Factor*, Iron and Steel Engineer Yearbook, pp. 281–291 (1964).
Kelk, George F., *New developments improve hot strip shape: Shapemeter–Looper and Shape Actimeter*, AISE Year Book, pp. 366–374 (1986).
Petraske, K.A., et al., *Development in Drive Systems and Gauge Control for Reversing Cold Mills*, Iron and Steel Engineer Yearbook, pp. 991–997 (1961).
Roberts, W.L., *Cold Rolling of Steel*, pp. 214–215.
Sorokin, V.O., *Design and Operation of Tensiometers*; Iron and Steel Engineer Yearbook pp. 458–462 (1961).

* cited by examiner

Primary Examiner—Edward Lefkowitz
Assistant Examiner—Octavia Davis
(74) Attorney, Agent, or Firm—Frost Brown Todd LLC

(57) ABSTRACT

A shapemeter for measuring the flatness of a tensioned metal strip has a plurality of coaxially aligned measuring rings, with each measuring ring being rotatably supported on the outer circumference by an associated force sensor.

35 Claims, 4 Drawing Sheets

US 6,658,947 B1

STRIP FLATNESS MEASURING DEVICE

TECHNICAL FIELD

The present invention relates generally to shapemeters that measure the flatness of metal strip under tension as the strip passes over a shapemeter roll.

BACKGROUND OF THE INVENTION

It is well known in the art that the best and perhaps the only practical way of measuring flatness of strip as it is being rolled by a strip rolling mill, with tension applied to incoming and outgoing strip, is to measure the tension distribution across the width of the strip, as it leaves the rolling mill and travels to a coiler or take-up reel, or some other downstream process.

In general, a strip which has uniform tension distribution would lie flat on a horizontal table if it was subsequently unwound from the coiler and set down with the tension removed. Strip having non-uniform tension distribution would, in general, not lie flat, but would be seen to have wavy or buckled portions, corresponding to the zones of the strip which had been rolled with the lowest tension.

An early shape or flatness measuring device is disclosed in Pearson, U.K. 1,160,112 and corresponding U.S. Pat. No. 3,499,306. The Pearson device of FIG. 1 of '112 was not a commercial success, but the Pearson device shown in FIG. 7 of '112 or the Pearson '306 patent was. This device and the one shown on FIG. 3 of Pearson '306 operated by sensing the tension distribution in the material, by passing it over a measuring roller.

The measuring roller of Pearson '306 consists of a central stationary ("dead") shaft, and a series of bearings mounted concentrically on the shaft. These bearings are placed side by side across the full width of the strip material. Transducers are provided at each bearing location to measure the radial force on the bearing, this being a measure of the tension in that portion of the material passing over that bearing. The Pearson device in FIG. 7 of '306 utilized fluid film bearings, and pressure transducers were used to measure fluid pressure, which is a measure of radial force. The device in FIG. 3 of '306 utilized roller bearings, with a flexible portion on each bearing inner race within the load zone of the bearing. A displacement transducer was used to measure the deflection of this flexible portion, this deflection being a measure of radial force.

Another stationary shaft shapemeter is disclosed in Muhlberg (U.S. Pat. No. 3,557,614), which is similar in concept to the FIG. 3 embodiment of Pearson '306 (but with additional features). The essential features in Muhlberg are a series of bearings mounted upon a common shaft, with suitable covering for the bearings and with a force sensing transducer mounted underneath some or all of these bearings, to measure the radial force developed on these bearings as a result of the strip wrapping around the roll under tension.

Yet another stationary shaft shapemeter is disclosed in Flinth (U.S. Pat. No. 3,413,846). Flinth used a shapemeter roll as a billy roll (which is normally understood in the art to be a roll located between a mill and a coiler, and is used to maintain a constant pass line level through the mill, while the coil diameter is building up (coiling), or reducing (uncoiling). The billy roll consisted of a central, stationary shaft, an outer casing rotatably mounted on the shaft, and a number of pressure sensing means arranged to be influenced by the pressure between the outer casing and the shaft.

The way in which all commercially available shapemeters work is by providing a roll around which the strip passes on its way from the rolling mill to the subsequent process. The strip wraps around the roll usually by an angle in the range 5° to 90°. In some applications this angle can be fixed. In others, for example when the roll is used as the only deflector roll (sometimes called a billy roll) between a rolling mill and a coiler, the wrap angle varies as the coil builds up in diameter as rolling progresses and more strip is added to the coil. However, in all cases a radial force develops on the roll as a result of the strip under tension wrapping around it, and shapemeters work by measuring the distribution of this force across the face of the roll, this being a measure of the distribution of tension across the width of the strip.

In these conventional shapemeters, the distribution of force is measured by a row of transducers mounted within this roll, usually spaced at fixed intervals in the range 20–60 mm across the face of the roll. Because the tension at the strip edges is very critical—since excessive tension at the edges can lead to strip breakage, particularly if the strip edges are cracked or otherwise defective—some shapemeters use smaller intervals or pitches in areas of the roll closer to the strip edges than in areas close to the middle of the strip. The portion of the roll corresponding to an individual transducer is known as a measuring zone, and each transducer measures the radial force produced by the portion of strip passing around the corresponding zone of the roll.

In principle there are two types of shapemeters covered by the above description. The first type utilizes a single roll mounted in bearings. Transducers are mounted within the roll, which is machined to provide cavities in which the transducers can be fitted. Each measuring zone, and hence each transducer, is covered with a thin ring of steel, which itself may be covered in an elastomeric material. The entire roll consists of a body which is sufficiently long to cover the maximum width of strip to be rolled, and an integral neck at each end of the body. Each neck is bearing mounted within fixed housings. The transducers all rotate with the roll, and therefore, they are only subjected to load for a small portion of each revolution of the roll. If the wrap angle of the strip is 30 degrees, for example, the transducers are loaded for only 30 degrees for each revolution, and are unloaded for the remaining 330 degrees.

In order to obtain electrical signals of load from the transducers (which are rotating), it is necessary to provide slip rings or other devices, such as multi-channel inductive or optical pickups or FM radio links, to transfer these signals to a computer or other display device that is positioned at a fixed location. Since there are multiple transducers, their signals are typically sampled and combined into one overall load-relative signal, thereby requiring multiple analog or digital comparators to choose the presently active signal (i.e., the signal of the greatest magnitude).

The second shapemeter type utilizes a stationary (non-rotating) shaft which spans across the width of the strip, and is supported in stationary support blocks. A separate bearing is mounted upon this shaft at each measuring zone, and on the outside of this bearing a plain or elastomer covered steel ring is mounted, covering the full width of the zone. On the inside of each bearing a fixed transducer is mounted within the shaft, this transducer measuring the radial force on the bearing. The output signal from each transducer can be directly wired to a stationary external computer or other display device, usually through an axial hole passing through the shaft, provided for this purpose. The transducers are loaded for the full 360° rotation of the roll. The shapemeter of U.S. Pat. No. 5,537,878 for example, as well as those of Pearson '306 FIG. 7, Muhiberg '614 and Filinth '846 are all the stationary shaft type.

Each of the above types of shapemeters has its advantages. The first type (rotating shaft) has the advantage that the shaft diameter is effectively the full diameter of the roll, and therefore this has greater rigidity and lower shaft stress and deflection than the second type. The second type (stationary shaft) has the advantage that no slip rings are required, and that the output signal is steady, and does not need to be sampled. The greater shaft deflection may not be significant when tensions are not too high, wrap angles are not too large, or roll face length is not too long. The deflection can also be reduced by using bearings with a very small section height, such as air film or oil film bearings, or by increasing the roll diameter.

All of the above shapemeter types are very expensive, because they all require a multiplicity of very accurately machined sleeve rings to be mounted on a central shaft, and the diameter of the central shaft must be large, in order to ensure that the effect of the shaft deflection does not render the flatness measurement inaccurate.

In general, the roll diameters of shapemeters available commercially lie in the range 313–406 mm (12.3–16 in.), with a shapemeter having a roll as small as 150 mm (5.9 in.) available only for aluminum strip (where tensions are very low) based on the Pearson device of FIG. 7 of Pearson '306. This shapemeter is considerably less expensive than the ones having larger rolls, but is still too expensive for many mills.

It is remarkable that, in general, only the largest cold rolling mills are equipped with shapemeters, even though the operators of the smaller mills would like to have them. The problem remains primarily one of cost. For a small mill the cost of some of the above types of shapemeter can approach the cost of the entire electrical drive system, and so is prohibitive.

In order to reduce the cost, the present invention incorporates rollers which are much smaller in diameter than prior art shapemeters. This not only reduces the weight and the cost, but also enables the shapemeter of the present invention to be fitted into spaces enabling it to be installed on a large number of cold rolling mills in which there is insufficient space for prior art shapemeters.

The invention will now be described by way of example.

BRIEF DESCRIPTION OF THE DRAWINGS

The accompanying drawings incorporated in and forming a part of the specification illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF AN EMBODIMENT OF THE PRESENT INVENTION

Figure 1:
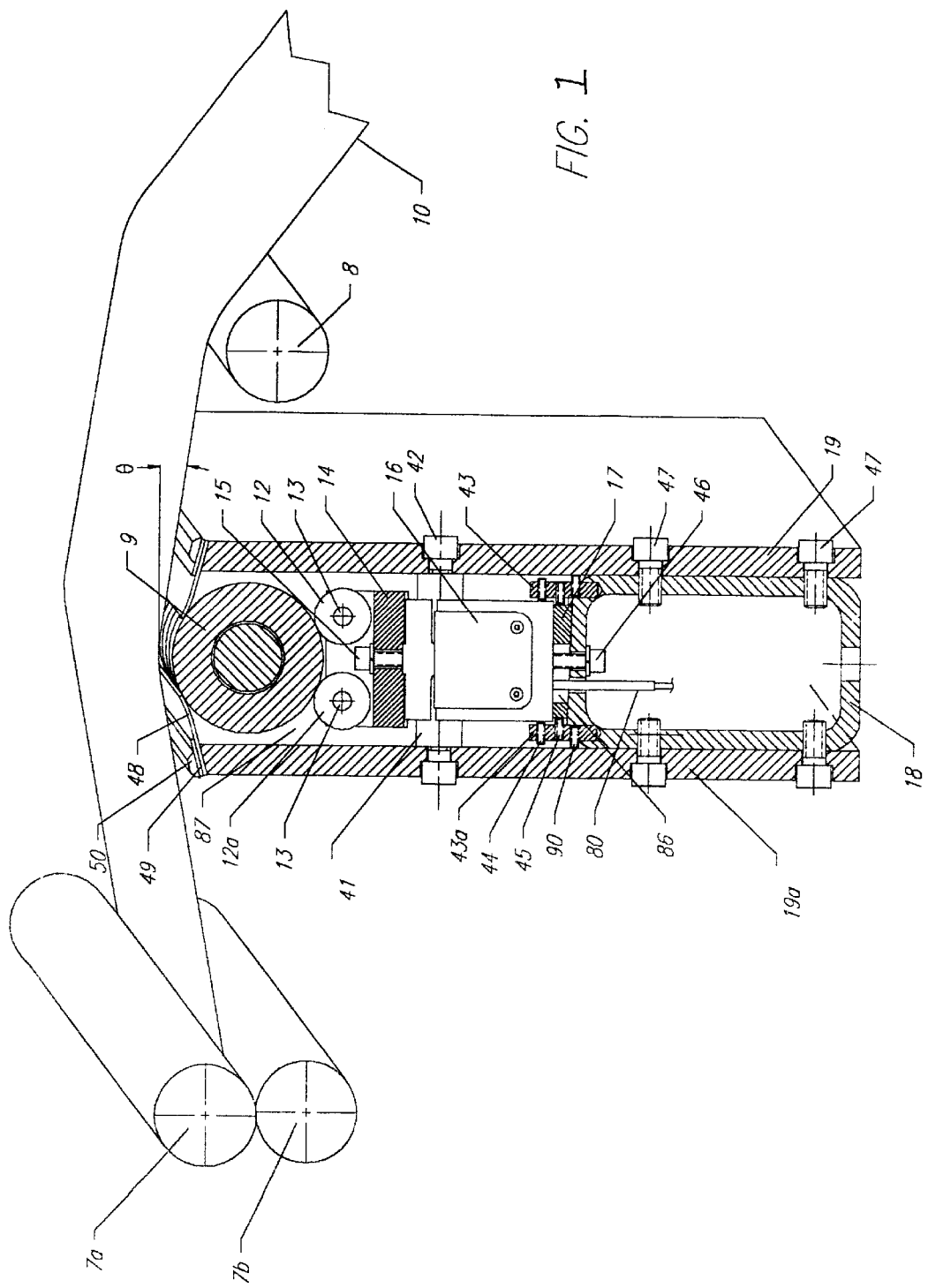
FIG. 1 is a perspective view of a shapemeter constructed in accordance with the present invention installed on a rolling mill, with the shapemeter shown in partial cross-section.

Referring now to the drawings in detail, wherein like numerals indicate the same elements throughout the views, in FIG. 1, strip 10 is shown travelling on a normally horizontal path between a cold strip rolling mill with work rolls 7a & 7b, and adjacent billy roll (deflector roll) 8 and the assembly of the present invention is raised in a vertical plane transverse to the direction of strip travel so that segmented roller 9 deflects the strip upwards from its normal path until a wrap angle θ of the strip over the segmented roller 9 is achieved. θ would normally be in the range 1 to 10 degrees, the angle depending upon the tension level in the strip and the desired vertical force to be developed on load cells 16. In principle this vertical force should be kept as small as possible, in order to minimize the possibility of marking of the strip surface by segmented roller 9.

Figure 2:
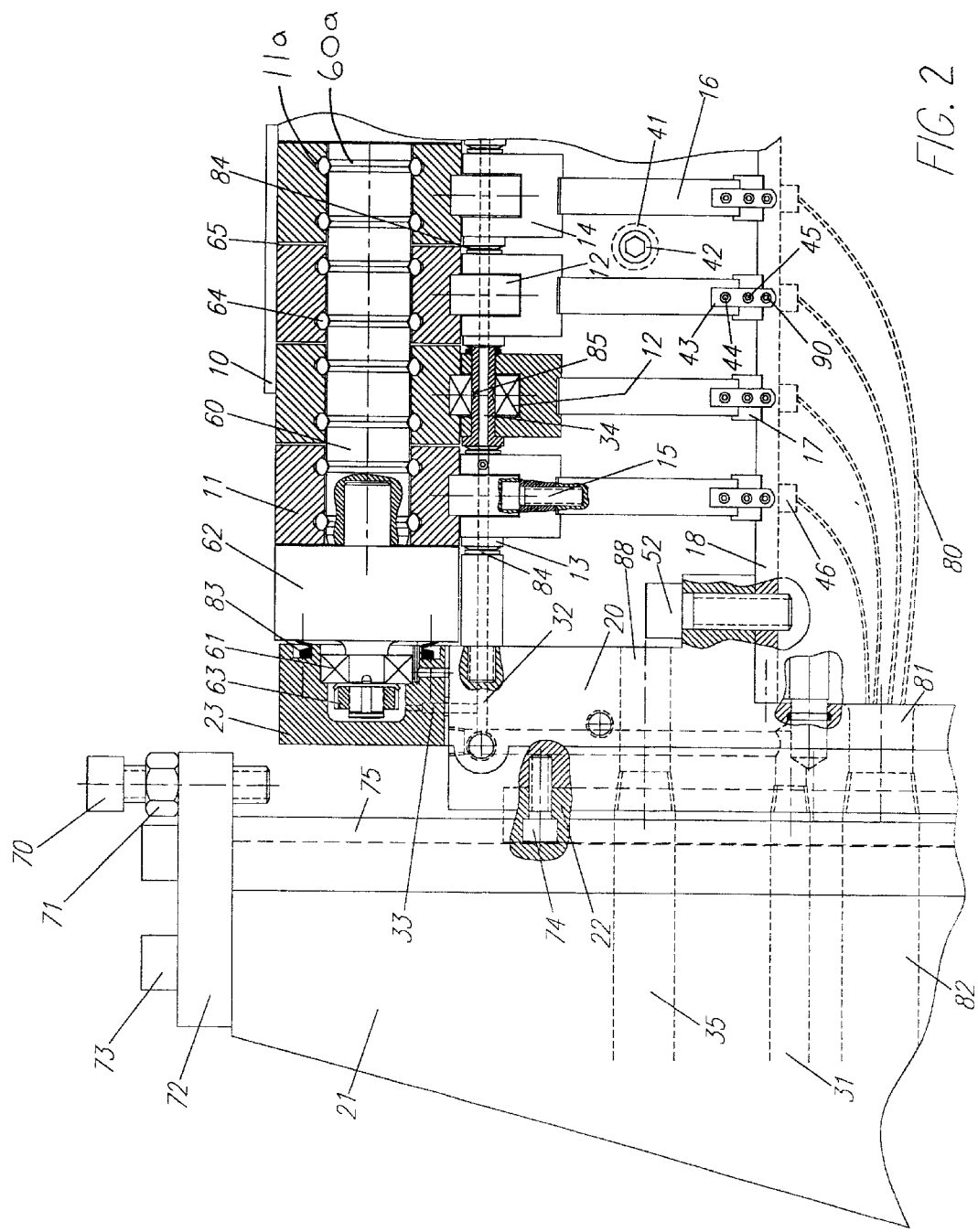
FIG. 2 is a fragmentary, transverse partial cross-section section of the shapemeter of FIG. 1.

As shown in FIG. 2, segmented roller 9 consists of a series of axially aligned/co-axial measuring rings 11 which are each mounted concentrically upon a central shaft 60 by resilient members 64. Measuring rings 11 span the entire width of strip 10, and segmented roller 9 is completed by steel end rings 62. Central shaft 60 is mounted on thrust bearings 61 in housings 23, at each end of said shaft.

Measuring rings 11 can be made from steel, bronze, nylon, polyurethane or other suitable material depending upon the application. Steel, particularly if it is hardened, has the advantage of ruggedness and high wear resistance, but the disadvantage that it is more likely to mark the surface of the strip passing over it.

Shaft 60 includes a plurality of annular grooves 60a, grouped in pairs that are associated with respective measuring rings 11. Measuring rings 11 each include a pair of annular grooves 11a which correspond to a pair of annular grooves 60a. Each annular groove 11a and annular groove 60a are engaged by a respective resilient member 64, which is annular in shape in the embodiment depicted, disposed about shaft 60. In the embodiment depicted, resilient member 64 are canted coil springs, also known as radial springs, made by Bal-Seal Engineering Corp of Foothill Ranch, Calif. The cant angle of the coil spring varies with the amount of preload.

Resilient members 64 and central shaft 60 cooperate together to locate measuring rings 11 axially on shaft 60 so that measuring rings 11 are spaced apart with respective gaps therebetween. Thus, the depth of annular grooves 11a and 60a are sized to allow resilient members 64 and shaft 60 to provide the desired functionality. Resilient members 64, as installed as annular rings, are radially preloaded, providing stiffness in the axial direction to locate measuring rings 11 axial and transmit any axial thrust developed on measuring rings 11 to shaft 60, yet being resilient enough in the radial direction so as not to transfer any significant radial force between measuring rings 11 and shaft 60, with support rollers 12 providing the primary support for measuring rings 11, as described below. With such a construction, measuring rings 11 are able to function independently of each other, yet sufficient radial torque is transferred between shaft 60 and measuring rings 11 through resilient member 64 to drive any of measuring rings 11 which are not in contact or are only in partial contact with strip 10 (for example those rings which are beyond the edges of strip 10, when the strip is narrow).

Although annular grooves and annular resilient members are depicted in the illustrated embodiment, other grooves may be used. For example, axial grooves could be formed in either shaft 60 on the inner surface of measuring rings 11, or both. A resilient strip, shaped complementarily to such axial grooves could be disposed therein. If there are axial grooves in both the shaft and the inner surface of the measuring rings 11, the resilient strip would engage both the shaft grooves and the measuring ring grooves. If axial grooves are only in one of shaft 60 or the measuring rings 11, then such a measuring strip would engage the grooves in either the respective inner surfaces of measuring rings 11 or the outer surface of shaft 60. In such an embodiment, there could be a single resilient strip the length of the axial groove in shaft 60 or a plurality of individual resilient strips disposed in or engaging a single axial groove of the shaft. If there are axial grooves in the measuring rings 11, the length of the resilient strips could be the length of the measuring rings 11. Regardless of the configuration by which measuring rings 11 cooperate with shaft 60 to achieve the desired results and functions, there remains the need to locate measuring rings 11 axially. Any suitable construction can be used, for example such as low friction spacers. Annular low friction washers as spacers could even include axially extending protuberances shaped complementarily to grooves in either or both shaft 60 or measuring rings 11, which act as the resilient members and provide the same function. Such protuberances could be circular in cross section, and could extend the entire width or only a portion of the width of measuring rings 11. It may even be possible to omit the gap between measuring rings 11, for example by providing a low friction coating on the ends of measuring rings 11, so long as the independent operation, as described herein, is preserved.

Figure 3:
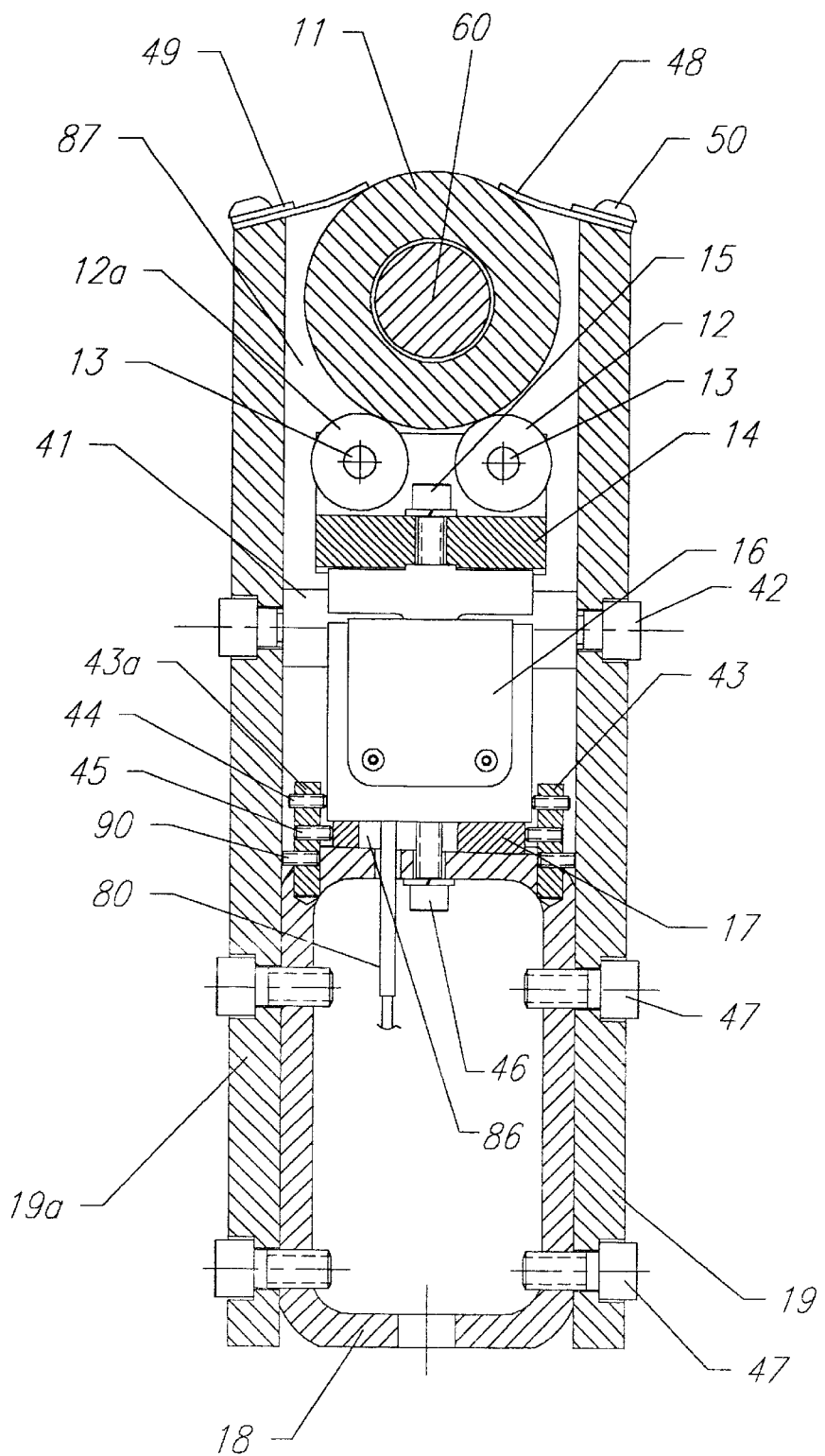
FIG. 3 is the cross-section shown in FIG. 1.

In common with most prior art shapemeters, the objective of the invention is to measure the transverse distribution of tension in the strip passing over segmented roller 9. This object is achieved, as shown in FIG. 3, by supporting each measuring ring 11 on a pair of support rollers 12 and 12a, such as anti-friction devices known as track roller bearings, which are designed to support a point or line load on their outer ring. Each pair of support rollers is carried by a respective force sensor, or load cell, 16, and is supported on a respective support shaft 13, each shaft being mounted on carrier 14, each carrier 14 being mounted upon a respective load cell 16, being attached by cap screw 15.

As depicted, carriers 14 are generally U-shaped, comprising a base with two spaced apart legs extending therefrom. Each leg has an opening which receives an end of a respective support shaft 13.

In the embodiment depicted, shafts 13 are stationary (do not rotate), and each support roller 12, 12a has an outer portion which is rotatable relative to an inner portion. Within the teaching of the present invention, other configurations in which shafts 13 are rotatable, so long as measuring rings 11 are supported such that they can rotate without interfering with the measurement of strip 10.

Load cells are of the type available commercially from such companies as Sensotec Inc., Interface Inc. and Revere Inc., and are similar to those known in the art as "S-type" load cells. They incorporate resistance strain gauge elements for load sensing.

Load cells 16 are adjustably mounted upon cross beam, or support member, 18, which extends across the whole width of the strip and supports all load cells 16. Each load cell has an associated adjustment which is adapted to move the respective load cell 16 with respect to support member 18 so as to adjust the respective positions of support rollers 12. The positions of measuring rings 11 are thereby individually adjustable in both vertical and horizontal radial directions. The associated adjustment may be of a variety of configurations which provide the necessary support and adjustability of load cells 16, support rollers 12 and measuring rings 11. In the depicted embodiment, the adjustment includes a respective wedge 17 disposed underneath an associated load cell 16 that can be adjusted and clamped in position using adjusting set screws 45, which are mounted in threaded holes in posts 43 and 43a, said posts being fixed in holes in cross beams 18 by set screws 90. This provides vertical adjustment of each measuring ring 11. Additional set screws 44 mounted in posts 43 and 43a are used to adjust and clamp the horizontal position of the load cell 16, to give horizontal adjustment of each ring. Because of dimensional variations in the various parts such adjustment is necessary to ensure that all measuring rings 11 when resting upon support rollers 12 and 12a, lie on a common axis, so that the assembly appears to the strip as a straight roller, and thus provides uniform support to the strip across its entire width.

After adjustment, screws 46 are used to clamp each load cell 16 and its support wedge 17 firmly to cross beam 18.

FIG. 3 shows frame 50 consisting of hollow cross beams 18 bolted to end blocks 20 by means of screws 52. The frame is guidably mounted in brackets 21 at each end, said brackets being mounted on the deflector roll support base of the mill (or other suitable existing structure, not shown). Guiding is provided by keys 22 which are captured in recesses in end blocks 20, and secured by screws 74 and engage in vertical slots 75 in brackets 21. The entire frame can be raised and lowered a few inches by hydraulic cylinders, (not shown) the purpose of this movement being to raise the roller 9 up to its working position (where it deflects the strip to create wrap angle θ as described above) and to lower the roller to its storage position. (where it is completely clear of the strip)

Stop bar 72 is attached to the top of each bracket 21 by screws 73, and adjustable stop screw 70, which engages in said stop bar, and can be fixed in position using lock nut 71, is used to set the working height of roller 9, the frame being raised by said hydraulic cylinders until end blocks 20 abut the stop screws 70.

Figure 4:
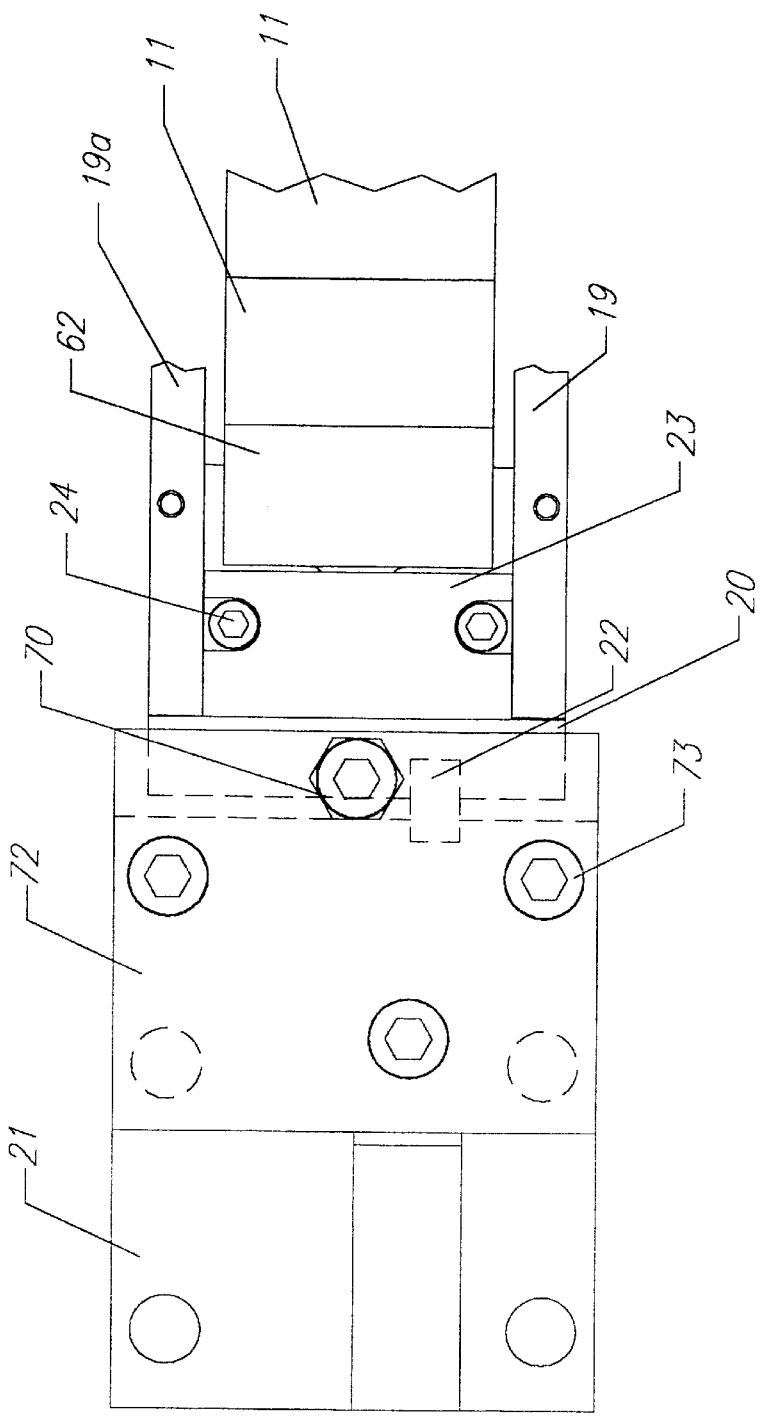
FIG. 4 is a fragmentary plan view of the shapemeter of FIG. 1, with the flexible elastomer strips omitted.

As can be seen in FIG. 4, Housings 23 at each end of roller 9 are attached to end blocks 20 by means of screws 24.

The support rollers 12 and 12a and thrust bearings 61 are lubricated with oil mist and, as shown in FIG. 3, this is delivered from a source through pipe 31 which is screwed into end block 20 at each end, and through passageways 32 and 33 to reach thrust bearings 61, and through passageway 32 to reach support shafts 13, where the oil passes through axial passageway 34 and radial passageway 85 to reach support rollers 12, 12a. "V-ring" seal 83 is used to prevent entry of external fluids into the thrust bearing, and smaller "V-rings" 84 are used to seal between ends of support roller shafts 13 to form a continuous passageway, thereby confining the oil mist to passageway 34, from which it can only escape by passing through radial (reclassifier) passageway 85 and into support rollers 12, 12a. Such V-rings are commercially available from such companies as CR Services of Elgin, Ill. and Merkel Corp. of Cleveland, Ohio.

The excitation/signal cable 80 for each load cell passes down through a slot 86 in wedge 17 and corresponding hole in the top of cross beam 18. These cables pass along the hollow core of the cross beam and pass through hole 81 in end block 20, and out through conduit 82 which is screwed into a matching pipe thread in end block 20. The cables are connected at the other end of said conduit to suitable electrical and/or computer equipment for amplification and display of the load signals.

Because of the small size of the devices used in this invention, it is essential to protect them from the possibility of damage. For this reason we provide heavy side guard plates 19 and 19a which are attached to the sides of cross beams 18 by screws 47. Further reinforcement is provided by studs 41, which act as spacers between guards 19 and 19a. The guards are attached to said studs by screws 42.

To prevent entry of rolling oil, which could have adverse effect on the load cells 16, the cavity 87, within which load cells 16, support rollers 12 and 12a and carriers 14 sit, is sealed by flexible elastomer strips 48 which are clamped to the top of guards 19 and 19a by means of steel clamp bars 49 and screws 50. These sealing strips rest against the surface of roller 9 and act to prevent entry of external fluids such as rolling oil, while providing minimum drag upon said roller.

Because this sealing method is imperfect (It is important to have small gaps 65 between adjacent measuring rings 11) cavity 87 will be lightly pressurized by compressed air which is introduced from one end through pipe nipple 35 which attaches to a pipe thread in end block 20, and hence, passes through hole 88 into cavity 87. This light pressurization (of the order of a few inches of water gauge) serves to help prevent entry of the rolling oil or other external contaminants.

Within the teachings of the present invention, alternate embodiments may be used. For example, shaft 60 may be omitted so long as measuring rings 11 remain coaxially aligned and supported in a manner that allows measurement of the load thereon. It is noted, however, that an additional purpose of shaft 60 is for safety purposes. In the case of a cobble, where the strip breaks and the strip nose can possibly strike measuring rollers 11 at high speed, although measuring rollers 11 are protected by side plates, shaft 60 provides an additional level of protection in that it retains measuring rollers 11 and thus stops them being thrown out of the machine.

In summary, numerous benefits have been described which result from employing the concepts of the invention. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A shapemeter for measuring flatness of a tensioned metal strip, said strip having a width and traveling in a direction of travel, by measuring distribution of tension across the width of the strip as the strip passes over said shapemeter, said shapemeter comprising:
   A. two spaced apart end blocks;
   B. a support member extending between said end blocks;
   C. a shaft having first and second ends, said shaft having an axis, said axis being generally parallel to said strip and normal to the direction of travel, said first and second ends being respectively rotatably supported by said end blocks;
   D. a plurality of spaced apart resilient members carried by said shaft;
   E. a plurality of measuring rings each disposed adjacent at least one resilient member, each of said measuring rings having a respective outer circumferential surface; and
   F. each of said measuring rings having a respective force sensor associated therewith, each respective force sensor carrying a respective pair of spaced apart rotatable support rollers, each respective support roller engaging said outer circumferential surface of the measuring ring associated with said respective force sensor which carries said respective support roller, each respective measuring ring being rotatably supported by said respective pair of support rollers.

2. A shapemeter for measuring the flatness of a tensioned metal strip, said strip having a width and traveling in a direction of travel, by measuring distribution of tension across the width of the strip as the strip passes over said shapemeter, said shapemeter comprising:
   A. a plurality of spaced apart measuring rings coaxially aligned along an axis, each of said measuring rings having a respective outer circumferential surface;
   B. each of said measuring rings having at least one force sensor associated therewith, each respective force sensor rotatably carrying a respective plurality of spaced apart support rollers, each respective support roller engaging said outer circumferential surface of the measuring ring associated with said respective force sensor which carries said respective support roller;
   C. said respective plurality of support rollers providing primary support for said measuring ring associated with said respective sensor which carries said respective plurality of support rollers.

3. A shapemeter for measuring the flatness of a tensioned metal strip, said strip having a width and traveling in a direction of travel, by measuring distribution of tension across the width of the strip as the strip passes over said shapemeter, said shapemeter comprising:
   A. a rotatable shaft having first and second ends, said shaft having an axis, said axis being generally parallel to said strip and normal to the direction of travel;
   B. a plurality of spaced apart resilient members carried by said shaft;
   C. a plurality of measuring rings disposed respectively adjacent at least one of said resilient members, each of said measuring rings having a respective outer circumferential surface; and
   D. each of said measuring rings having at least one force sensor associated therewith, each respective force sensor carrying a respective plurality of spaced apart rotatable support rollers, each respective support roller engaging said outer circumferential surface of the measuring ring associated with said respective force sensor which carries said respective support roller, each respective measuring ring being rotatably supported by said respective plurality of support rollers.

4. The shapemeter of claim 1, 2 or 3, wherein each of said support rollers has a respective central opening, said shapemeter including a plurality of support shafts having respective first and second ends, each one of said support shafts being at least partially disposed in the central opening of a respective associated support roller, whereby each of said support shafts supports said respective associated support roller.

5. The shapemeter of claim 2 or 3, comprising a support member disposed generally parallel to said axis, said support member carrying each said force sensor.

6. The shapemeter of claim 5, wherein each said force sensor respectively include electrical wire extending therefrom, and wherein said support member includes respective openings associated with each respective force sensor, said electric wire of a respective force sensor passing through said respective opening of said support member.

7. The shapemeter of claim 5, wherein each support roller has a position, each said force sensor has an associated adjustment configured to move said force sensor with respect to said support member whereby the position of the support rollers carried by said force sensor may be adjusted.

8. The shapemeter of claim 7, wherein said adjustment is configured to move the associated force sensor in a direction parallel to said direction of travel.

9. The shapemeter of claim 7, wherein said adjustment is configured to move the associated force sensor in a direction perpendicular to said axis.

10. The shapemeter of claim 1 or 3, including a plurality of grooves formed in at least one of said shaft or said measuring rings, each groove being at least partially engaged by at least one of said resilient members.

11. The shapemeter of claim 10, wherein said grooves are annular.

12. The shapemeter of claim 10, wherein said grooves are axial.

13. The shapemeter of claim 1 or 3, wherein each of said measuring rings includes a respective inner surface and an annular groove formed in said inner surface for each adjacent resilient member, each said adjacent resilient member engaging an associated annular groove.

14. The shapemeter of claim 13, wherein said shaft includes a plurality of annular shaft grooves, each of said annular grooves being engaged by a respective resilient member.

15. The shapemeter of claim 1 or 3, wherein said resilient members are radially preloaded.

16. The shapemeter of claim 1 or 3, wherein said resilient members, shaft and measuring rings cooperate together to axially locate said measuring rings on said shaft, transmit axial thrust which might develop on said measuring rings to said shaft, and to avoid transferring significant radial force exerted on any of the measuring rings to any other measuring rings.

17. The shapemeter of claim 16, wherein said resilient members, shaft and measuring rings cooperate together to cause said measuring rings to rotate together.

18. The shapemeter of claim 1 or 3, comprising respective gaps between adjacent measuring rings.

19. The shapemeter of claim 1, wherein there is not a respective gap between adjacent measuring rings.

20. The shapemeter of claim 19, wherein each of said measuring rings comprises at least one respective end having low friction coating thereon.

21. The shapemeter of claim 4, wherein said support shafts are stationary.

22. The shapemeter of claim 21, wherein each of said support rollers respectively comprises an inner portion and an outer portion, said outer portion being rotatable relative to said inner portion.

23. The shapemeter of claim 21, wherein each of said support rollers respectively comprises a bearing.

24. The shapemeter of claim 4, wherein each of said support rollers respectively comprises an annular portion which is rotatable with respect to the associated support shaft, wherein each of said support shafts respectively comprises an internal passageway formed between the respective first and second ends thereof, said internal passageway including a radial passageway disposed intermediate said first and second ends, and wherein said shapemeter includes an oil passageway in fluid communication with said internal passageway, whereby oil may be directed toward the annular portion of the associated support roller through said internal passageway.

25. The shapemeter of claim 24, wherein the respective internal passageway of a plurality of said plurality of said support shafts are aligned with each other, thereby forming a continuous passageway.

26. The shapemeter of claim 25, comprising at least one respective seal disposed so as to seal between adjacent internal passageways.

27. The shapemeter of claim 4, comprising a plurality of carriers, each of said carriers being carried by an associated force sensor, each carrier carrying the respective associated support shaft of each support roller which is carried by said associated force sensor.

28. The shapemeter of claim 27, wherein each of said carriers include a base and two spaced apart legs extending from said base generally forming a U shape, each leg including an opening for each respective associated support shaft carried by the carrier, each end of said respective support shaft being disposed at least partially in said respective opening.

29. The shapemeter of claim 4, wherein each of said support rollers respectively comprises an inner portion and an outer portion, said outer portion being rotatable relative to said inner portion.

30. The shapemeter of claim 29, wherein said support rollers comprise bearings.

31. The shapemeter of claim 1, wherein each said force sensor is carried by said support member.

32. The shapemeter of claim 31, wherein each said force sensor respectively include electrical wire extending therefrom, and wherein said support member includes respective openings associated with respective force sensors, said electric wire of a respective force sensor passing through said respective opening of said support member.

33. The shapemeter of claim 31, wherein each said force sensor has an associated adjustment configured to move said force sensor with respect to said support member whereby the position of the support rollers carried by said force sensor may be adjusted.

34. The shapemeter of claim 33, wherein said adjustment is configured to move the associated force sensor in a direction parallel to said direction of travel.

35. The shapemeter of claim 33, wherein said adjustment is configured to move the associated force sensor in a direction perpendicular to said axis.

* * * * *